US009619684B2

(12) United States Patent
Auer (10) Patent No.: US 9,619,684 B2
(45) Date of Patent: Apr. 11, 2017

(54) METHOD FOR RECORDING DATA (71) Applicant: MKW ELECTRONICS GMBH, Weibern (AT)

(72) Inventor: Wolfgang Auer, Weibern (AT)

(73) Assignee: SMARTBOW GMBH, Weibern (AT)

( * ) Notice: Subject to any disclaimer, the term of this patent is extended or adjusted under 35 U.S.C. 154(b) by 0 days.

(21) Appl. No.: 14/410,422

(22) PCT Filed: Jun. 21, 2013

(86) PCT No.: PCT/AT2013/000103
§ 371 (c)(1),
(2) Date: Dec. 22, 2014

(87) PCT Pub. No.: WO2013/188895
PCT Pub. Date: Dec. 27, 2013

(65) Prior Publication Data
US 2015/0339501 A1 Nov. 26, 2015

(30) Foreign Application Priority Data

Jun. 22, 2012 (AT) .................................. A 705/2012

(51) Int. Cl.
*G06F 17/00* (2006.01)
*G06K 7/10* (2006.01)
(Continued)

(52) U.S. Cl.
CPC ......... *G06K 7/10396* (2013.01); *A61D 1/025* (2013.01); *A61D 7/00* (2013.01); *G06K 7/10475* (2013.01)

(58) Field of Classification Search
CPC .......... G06K 5/00; G06K 19/00; G06F 19/00; G06Q 30/00; G06Q 90/00
(Continued)

(56) References Cited

U.S. PATENT DOCUMENTS 5,811,897 A 9/1998 Spaude et al.
7,670,292 B2 * 3/2010 Haynes ......................... 600/443
(Continued)

FOREIGN PATENT DOCUMENTS

AT 509892 12/2011
DE 19547560 6/1997
(Continued)

OTHER PUBLICATIONS

International Search Report for PCT/AT2013/000103, English translation attached to original, Both completed by the European Patent Office on Dec. 12, 2013, All together 5 Pages.
(Continued)

Primary Examiner — Edwyn Labaze
(74) Attorney, Agent, or Firm — Brooks Kushman P.C.

(57) ABSTRACT

A method and a system for recording data that are generated by manipulating an animal, which can be done by a manipulator, wherein the data are transmitted from a transmission apparatus to a reception apparatus, wherein a network including the transmission apparatus, the reception apparatus and the animal is set up for the purpose of transmitting the data, and wherein the animal is recognized from an identification code and the data are associated with the animal. As part of the data from the manipulation, the identity of the manipulator is also captured.

10 Claims, 4 Drawing Sheets (51) Int. Cl.
*A61D 1/02* (2006.01)
*A61D 7/00* (2006.01)

(58) Field of Classification Search
USPC .............. 235/375, 487, 385, 382; 340/573.1, 340/572.1
See application file for complete search history.

(56) References Cited

U.S. PATENT DOCUMENTS

| | | | |
|---|---|---|---|
| 8,005,688 | B2 | 8/2011 | Coffman et al. |
| 2001/0044731 | A1 | 11/2001 | Coffman et al. |
| 2002/0010390 | A1* | 1/2002 | Guice ................. A01K 11/008 600/300 |
| 2002/0038392 | A1 | 3/2002 | De La Huerga |
| 2003/0038721 | A1* | 2/2003 | Hogan ...................... 340/573.3 |
| 2003/0043043 | A1* | 3/2003 | Hogan ................. A01K 11/004 340/573.3 |
| 2003/0125017 | A1 | 7/2003 | Greene et al. |
| 2003/0164401 | A1 | 9/2003 | Andreasson et al. |
| 2010/0253476 | A1* | 10/2010 | Poutiatine ............ A61J 7/0053 340/10.1 |
| 2012/0179004 | A1 | 7/2012 | Roesicke et al. |
| 2012/0294876 | A1* | 11/2012 | Zimmerman .............. 424/184.1 |
| 2012/0323590 | A1* | 12/2012 | Udani .................. G06Q 10/103 705/2 |
| 2013/0046173 | A1* | 2/2013 | Hyde ................... A61B 5/4833 600/431 |
| 2013/0138389 | A1* | 5/2013 | Gyongy et al. ............... 702/141 |
| 2014/0140582 | A1* | 5/2014 | Spicola, Jr. ................... 382/110 |

FOREIGN PATENT DOCUMENTS

| | | |
|---|---|---|
| EP | 0109184 | 5/1984 |
| EP | 0824799 | 8/2002 |
| EP | 2208458 | 7/2010 |
| WO | 0149343 | 7/2001 |
| WO | 03071943 | 9/2003 |

OTHER PUBLICATIONS

Website http://de.wikipedia.org/wiki/IEEE_802.11s Wikipedia Article retrieved on Jan. 22, 2015, English translation attached to original, All together 8 Pages, "IEEE 802.11s".
Website http://de.wikipedia.org/wiki/IEEE_802.11 Wikipedia Article retrieved on Jan. 22, 2015, English translation attached to original, All together 22 Pages, "IEEE 802.11".
Website http://de.wikipedia.org/wiki/IEEE_802.15.4 Wikipedia Article retrieved on Jan. 22, 2015, English translation attached to original, All together 15 pages, "IEEE 802.15.4".
Website http://de.wikipedia.org/wiki/Ultrabreitband Wikipedia Article retrieved on Jan. 22, 2015, English translation attached to original, All together 8 Pages, "Ultra-wideband".

* cited by examiner

METHOD FOR RECORDING DATA

CROSS-REFERENCE TO RELATED APPLICATION

This application is the U.S. national phase of PCT Application No. PCT/AT2013/000103 filed on Jun. 21, 2013, which claims priority to AT Patent Application No. A705-2012 filed on Jun. 22, 2012, the disclosures of which are incorporated in their entirety by reference herein.

The invention relates to a method for recording data that are generated by the manipulation of an animal, wherein the data are transmitted from a transmitter to a receiver, wherein a network comprising the transmitter, the receiver and the animal is set up for the transmission of the, and wherein the animal is recognized on the basis of an identification code and the data are associated with the animal, and also to a system for recording data that are generated by the manipulation of an animal, wherein the system comprises a network for the transmission of the data, wherein the network comprises at least one transmitter and at least one receiver that are designed for communication via the skin of the animal, and wherein the transmitter and/or the receiver comprises a data memory that stores a software program.

To maintain the health of animals, it is sometimes necessary for said animals to be administered (as a precaution) with medicaments. In herding, however, this is sometimes a problem, for example when all animals need to be vaccinated. Often, the data generated by the medication are recorded manually, with the data being recorded in handwritten form for the time being and being transferred to an EDP system only later. However, there are also mobile appliances that allow data entry by the physician in situ. Data inputs while the medicaments are being administered to the animal are difficult, however, since animals do not stand still owing to the stress caused by the vaccination. It is therefore also not possible to guarantee that the administered medication has also actually been administered to the animal. By way of example, a sudden movement by the animal can lead to the needle of a vaccination gun being pulled out and the vaccine being delivered "into thin air". Particularly in the case of very large animal herds, it may therefore be that this failed medication is not recognized and there are consequently animals without appropriate vaccine protection.

Networks for monitoring body functions of an animal have already been described to a great extent in the prior art. By way of example, EP 2 208 458 A1 describes such a network comprising at least two different network nodes that can be connected to the body of the animal, wherein at least two of the network nodes each have at least one medical function, particularly a diagnostic function and/or a medication function, wherein the network nodes are set up to communicate with one another and interchange data and/or commands directly via the body of the animal. This network may also have actuators in "drug delivery" systems, as a result of which the automatic administration of medicaments is thus possible. The system is thus geared toward the measurement of a parameter being taken as a basis for administering a medicament when the parameter is outside the normal range. Whether the medicament has actually been administered can be established not directly but rather only by tracking the alteration in the parameter.

EP 0109184 A2 (published in 1984), DE 195 47 560 A1 (published in 1997) and show an identification system for people, wherein an appliance that may have the form of a wristwatch, for example, is intended to be worn by a person, wherein the appliance stores an identification code, wherein the identification code is transmitted from the appliance to another appliance via the skin of the person and wherein the other appliance checks the code and, in the event of a positive check result, enables it for the purpose of operability. The appliance is thus used as a type of ID card for a person that allows said person to be able to switch something solely by touching it with his fingers. An example of an application is a door locking system for a motor vehicle. There is no mention of applicability to medical purposes.

In 1997, EP 0 824 799 B1 (published in 1998) showed a wireless communication system, wherein an appliance is fitted to the body of a human being and couples signals into the latter. The body forwards said signals wirelessly. Possible applications are proximity detection and gesture control. There is no mention of any medical application.

US 2003125017 A1 describes a network that can be applied in the healthcare sector for human beings. A patient wears on his body an appliance that stores at least one identification code for the patient in respect of a data processing installation. Treatment appliances also have an identification code. In the event of a patient being treated using a treatment appliance, the match between patient and envisaged treatment is automatically checked and the treatment is documented. There is no provision for identification of the staff that performs a treatment.

WO 200149343 A2 describes a system for vaccinating animals and for data recording in this connection. The vaccination gun provided with an identity number is equipped with a transmission and reception device that allows it to communicate with an electronic animal tag fitted to the animal and thus to establish and store the identity of an animal that is being vaccinated. The data are immediately or later read from the vaccination gun into a central data processing installation, various methods of data transmission being cited. There is no provision for identification of the person performing the vaccination. There is merely provision for it to be necessary to input who takes out the vaccination gun and what is administered thereby in the central data processing installation.

The object of the present invention is for medical manipulations on animals to be better documented, rendered better able to be checked and made more reliable and, at the same time, for the complexity of work for the people concerned thereby to be not increased but rather reduced.

This object is achieved firstly by means of the method cited at the outset and secondly by means of the system cited at the outset, the method having provision for the identity of the manipulator also to be captured as part of the data for the manipulation.

In an advantageous further development, the data for the manipulation are sent only after conclusion of the manipulation and in the event of positive completion of the manipulation, and the system has provision for it to comprise an apparatus for identifying the manipulator that is also incorporated in the network and for the software program to prevent storage of the data until the transmitter transmits the positive conclusion of the manipulation.

In this case, one advantage is that not only is it possible for the data from the manipulation on the animal to be recorded automatically, that is to say that manual data capture is avoided, which improves data integrity and also the completeness of the data record, the data capture is also not automatically generated when an action is initiated, but only when said action has also actually been concluded positively. This means that it is therefore possible to select data records for animals that do not have the appropriate entry for the action, for example vaccination, insemination, temperature measurement, etc., which means that those animals for which the action needs to be repeated are recognized. On the basis of the automatic data transmission during the action, it is possible for the erroneous action to be immediately repeated in the case of mass vaccination, for example, as a result of which the veterinary surgeon thus does not have to be requested a second time. The incorporation of the animal itself into the network, that is to say particularly the data transmission via the skin of the animal, makes it possible to avoid the use of erroneous data for large herds, which erroneous data can be generated when the data are interchanged via radio, for example, since the meagre space, for example during vaccination, means that network nodes can read not only the data from the correct animal but also the data from immediately adjacent animals.

A further advantage is that when recording a manipulation—such as a vaccination—there is automatically also recording of who the manipulator—for example a particular veterinary surgeon—is. In comparison with systems in which this does not occur, work complexity for logging is avoided, and also verifiability is improved and greater certainty that the documentations of the manipulations are complete and error-free is achieved.

According to one variant embodiment, the data are sent only on condition that the network has not been interrupted during the manipulation. This makes it a simple matter to implement a further increase in data integrity or avoidance of erroneous data. Using the example of a vaccination gun, if, during vaccination, the vaccination gun, which forms a transmitter in the network, is unintentionally pulled out of the animal before the vaccination has concluded, the data line via the body, particularly the skin, of the animal, is interrupted. Hence, it is a simple matter to recognize that the vaccination gun has been pulled out too early and hence that the administration of vaccine is incomplete.

Alternatively, it is possible for an error code to be sent in the event of negative completion of the manipulation (that is to say in the event of erroneous or incomplete performance of the manipulation), as a result of which the evaluation for the subsequent medication or repeat manipulation on the animal can be simplified by means of selection of the data records with an error code.

According to the invention, the manipulation is performed by a manipulator, wherein the manipulator has an identification signature that is transmitted to the receiver before, at the beginning of or during the manipulation. In preferred approaches, the transmitter also has an identification signature that is transmitted to the receiver before, at the beginning of or during the manipulation and/or the manipulation is administration of a substance to the animal, which substance has an associated identification signature that is transmitted to the receiver before, at the beginning of or during the manipulation, and/or the manipulation is performed using a manipulation apparatus, wherein the manipulation apparatus has an identification signature that is transmitted to the receiver before, at the beginning of or during the manipulation.

At least one of these variant embodiments, wherein all of these variant embodiments are implemented in the preferred embodiment of the invention, is used to increase the automatism of the data association further, which allows a further improvement in the certainty of the associated data being correct. It is therefore possible to achieve at least largely complete recording of the elements or actuators involved in the manipulation. In addition, the data capture for the substance can also be used to achieve automatic stock keeping for this substance. It is easier to comply with the recording duty for medicaments for which recording is obligatory, for example antibiotics, i.e. it is possible to demonstrate more quickly that the purchased quantity matches the administered quantity, with the data being able to be forwarded to the relevant authority directly if need be, which means that subsequent corruption of the data can also be precluded.

The data are preferably transmitted to a data processing installation wirelessly, which means that the subsequent reading of the data into the data processing installation is dispensed with, in particular also cannot be forgotten. This makes it possible to achieve corresponding unburdening of the animal husbandman or the manipulator.

Preferably, an electronic animal tag fitted to the animal is incorporated into the network so as thereby to simplify association of the data with the relevant animal. Hence, it is also possible for the data to be stored in said animal tag, which means that said data are also immediately available in situ as a result of the data being read using a mobile reader, for example.

Provision may also be made for touching the animal with the manipulation apparatus to transmit data associated with the animal to the manipulation apparatus and preferably to display said data thereon. The effect that can be achieved by this is that the manipulation apparatus can be used to store the data for the animal, particularly the identification code thereof, which means that the manipulation apparatus is able to recognize at a later time whether or not a particular animal has already been treated. If treatment has already taken place, a stop in the manipulation apparatus can thereby be initiated that prevents further treatment. Secondly, this also allows visual inspection by the manipulator, that is to say the physician, for example, as to whether he has the correct animal in front of him.

In a preferred embodiment of the system, the manipulation apparatus is formed by a vaccination gun or a medical thermometer or an insemination device.

The network of the system may also comprise an electronic animal tag. In this case, the receiver may be formed by the animal tag. Hence, data relating to manipulations (e.g. vaccinations) on the animal are stored directly on the animal tag that is on the animal and are therefore easily retrievable when needed when the animal is present, even without a network at all.

According to a variant embodiment in this regard, the animal tag can form a network node in a locating system. This allows a particular animal to be located in a relatively large herd, so that (subsequent) treatment of a particular animal can be performed more quickly by virtue of the animal being able to be found more quickly. This is particularly advantageous when failed treatment as a result of nonadministration of a substance has occurred in a few animals.

To allow the invention to be understood better, it is explained in more detail with reference to the figures below.

In a particularly simplified illustration in each of the figures.

By way of introduction, it should be stated that, in the embodiments described in different ways, parts that are the same are provided with the same reference symbols or the same part designations and the disclosures that the description as a whole contains can be transferred mutatis mutandis to parts that are the same with the same reference symbols or the same part designations. The position statements chosen in the description, such as at the top, at the bottom, at the side, etc., also relate to the figure that is immediately being described or illustrated and, in the event of a change of position, can be transferred mutatis mutandis to the new position.

Figure 1:
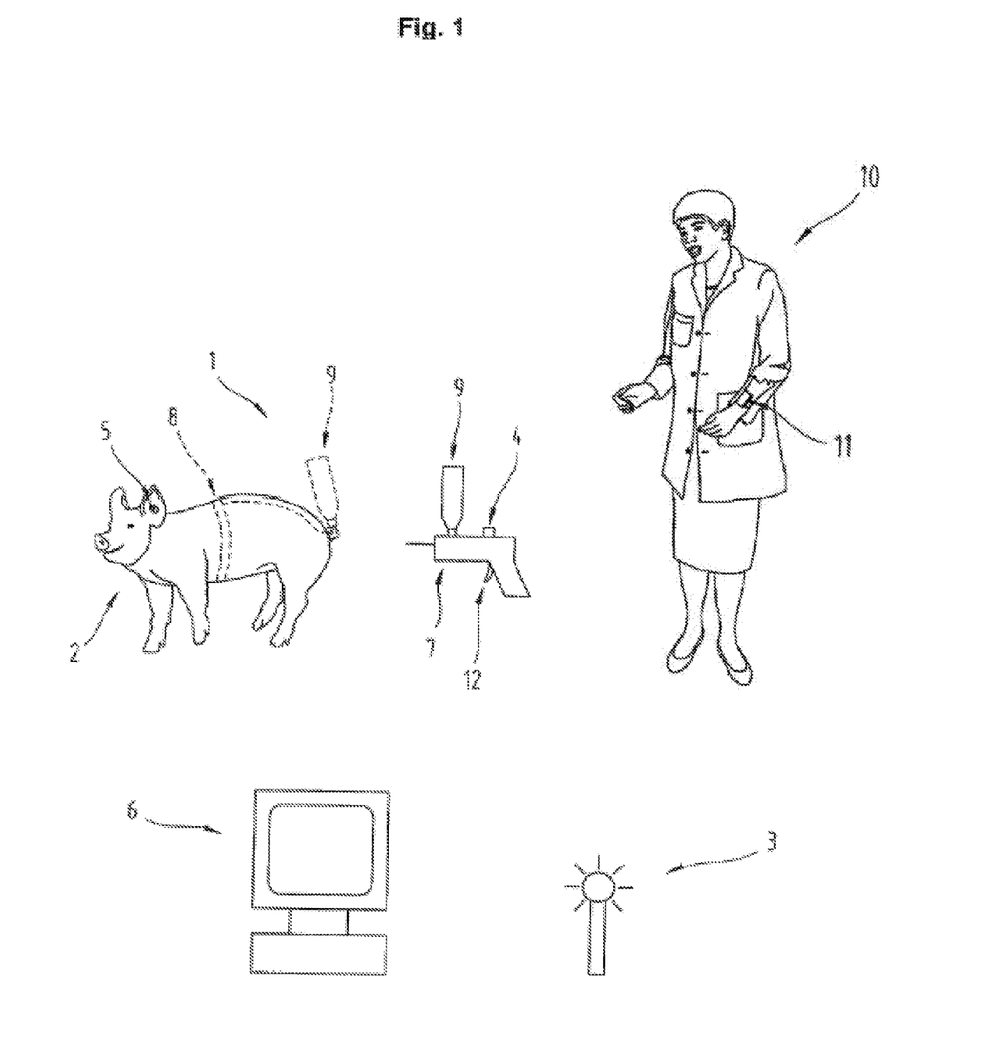
FIG. 1: shows a schematic illustration of the vaccination of an animal.

FIG. 1 illustrates a system 1 for recording or capturing data that are generated by the manipulation of an animal 2 or on an animal 2.

The manipulation on the animal 2 is preferably the administration of a substance, particularly a medicament or a vaccine, preferably in liquid form, the insemination of the animal 2 or the measurement of the body temperature of the animal 2. In principle, however, other manipulations on the animal 2 are also conceivable, particularly manipulations in which something is administered to the animal 2.

In the simplest variant embodiment, the system 1 comprises at least one reception apparatus 3 for data, at least one transmission apparatus 4 for data, wherein the at least one reception apparatus 3 and the at least one transmission apparatus 4 are combined during performance of the method according to the invention to form a network for the data transmission.

Preferably, the animal 2 itself, particularly the skin of the animal 2, is incorporated into this network for data transmission, at least during the transmission of the data that are generated by the manipulators of the animal 2 or on the animal 2, that is to say during the administration of the substance or during the measurement of the body temperature or during the insemination, for example. In this case, the animal 2 is used to conduct animal-specific data.

By way of example, animal-specific data may be the name of the animal 2, an identification code for the animal 2, the weight of the animal 2, the age of the animal 2, etc. These data may be held in an electronic animal tag 5, particularly an electronic ear tag, or a microchip, particularly an implanted microchip, i.e. an appropriate memory device for said data that the animal tag 5 comprises. Similarly, it is possible for said data to be stored centrally, for example in an electronic data processing installation 6, e.g. a PC, from which they are read via the animal tag. Alternatively, hybrid variants are possible, for example the animal tag 5 contains only the identifier of the animal 2 and the further animal-specific data are associated with said identifier in the sequence from the data processing installation 6. In the simplest case, however, the identifier of the animal 2, i.e. the identification code associated with the animal, is sufficient to be able to associate the data generated during the manipulation explicitly with the animal.

Preferably, an electronic ear tag is used. Such ear tags are already known from the prior art, for example from AT 509 892 A from the applicant, which, to this extent of the comments relating to the animal tag, is part of the content of a substantive application. Accordingly, the animal tag 6 may have an electronic circuit that comprises one or more of the following assemblies: a reed contact that can be used to switch the animal tag on and/or off, a radio interface, a transponder, an antenna for the radio interface, at least one infrared sensor, a vibration motor, at least one light source, particularly at least one light-emitting diode, a compass, a position sensor, a motion sensor, an acceleration sensor, means for locating, particularly a GPS receiver, a microcontroller, at least one light sensor, at least one receiver, at least one gas sensor, a storage battery or a battery and/or an electricity generator. For the functions of the individual parts of the electronic circuit, reference is made to AT 509 892 A.

The reception apparatus 3 is connected to the data processing installation 6 at least during the manipulation on the animal 2 for the purpose of data interchange or data transmission. Alternatively, it may be continually or constantly in contact with the data processing installation. In the preferred variant embodiment, however, the reception apparatus 3 is integrated in the data processing installation 6, i.e. it forms a unit therewith.

The at least one reception apparatus 3 and the at least one transmission apparatus 4 may be in a form or designed in accordance with the prior art for such apparatuses.

In the case of this variant embodiment, the transmission apparatus 4 is arranged on a manipulation apparatus 7 or forms an integral part therewith. Preferably, the transmission apparatus 4 is connected to the manipulation apparatus 7 such that isolation therefrom is possible only using a tool.

In the variant embodiment shown in solid lines in FIG. 1, the manipulation apparatus 7 is a vaccination gun. However, it may also be formed, by way of example, by an insemination belt 8 (shown in dashed lines in FIG. 1), the basic design of which is known from the prior art, or a temperature measuring apparatus, particularly a thermometer.

If the manipulation apparatus 7 is intended to be used to administer a substance, particularly a medicament or a vaccine or an insemination fluid, to the animal 2, it may have a container 9 that contains the substance.

The manipulation apparatus 7 is preferably incorporated into the network for data interchange at least during the manipulation.

The animal tag 5 preferably forms a network node in a locating system that can be used to locate the animal 2. Such locating systems are already known from the prior art.

The locating or localization can take place in a manner known per se, for example using the "time difference of arrival" method known from the prior art. Since these methods are known from the prior art, reference may be made to the relevant literature in this regard.

The locating system may have a plurality of transmission and reception modules (not shown in FIG. 1), with the animal tag 5 forming one of said transmission and reception modules. The reception apparatus 3 and/or the transmission apparatus 4 may also be in the form of such transmission and reception modules. At least one of said transmission and reception modules, preferably a plurality, are in the form of what are known as anchor nodes with a fixed position for localization and preferably wireless data transport. In respect of the location coordinates, the further transmission and reception modules can form variable (anchor) nodes, the location coordinates of which can be determined using the fixed anchor nodes by means of triangulation, for example.

The position finding for the transmission and reception module(s) can take place in the data processing installation 6.

The locating system may be of the following design. The anchor node network formed from the anchor nodes communicates among said anchor nodes using the 802.11s standard (Draft, Mesh Network; http://de.wikipedia.org/wiki/IEEE_802.11s). The data interchange in the network with clients (13, 14, 15, 16) takes place using the 802.11.bgn standard for the anchor nodes or using a wireless network, particularly the Internet (http://% de.wikipedia.org/wiki/IEEE_802.11). The localization of the transmission and reception modules takes place using the 802.15.4a standard for the anchor nodes (http://de.wikipedia.org/wiki/IEEE_802.15.4 or http://de.wikipedia.org/wiki/Ultrabreitband).

The position of the animal tag 5 can also be calculated in the anchor node(s). To this end, it is possible for each transmission and reception module of an animal tag 5 to store a list of available anchor nodes and for a different anchor node to be selected from this list for determining the position of the animal tag 5 for each new position calculation. To this end, each transmission and reception module can send a localization log to a central computation unit, the localization log also being used to send the identifier of the anchor node that is to be used for a position calculation, and, as soon as the localization log and a localization signal arrive(s) at the (listening) anchor node(s), the central computation unit sends log packets to the corresponding anchor node for position calculation.

Alternatively, other implementations of the locating system, as are described in the prior art, are possible.

According to the invention, a manipulator 10, that is to say a veterinary surgeon, for example, is incorporated into the network for data interchange at least during the manipulation on the animal 2. Preferably, to this end, the manipulator is provided with a transmission apparatus 12, which may additionally be in the form of a reception apparatus if need be, for example in the style of a wristwatch.

The preferred procedure for recording data from the manipulation of the animal 2 provides for the following course of the method—using the example of vaccination:

For vaccination of the animal 2 by the manipulator 10, that is to say the veterinary surgeon, said veterinary surgeon is recognized in personified fashion by the system 1. To this end, the transmission apparatus 11 carried by the manipulator stores an identification signature that is transmitted to the reception apparatus 3, that is to say particularly the data processing installation 6, before, at the beginning of or during the manipulation. This data transmission uses an appropriate software program in the data processing installation 6 to produce an entry in a vaccination log, for example for the name of the manipulator 10 and the time and date of the manipulation or the data capture.

The data from the manipulator 10 can be transmitted directly to the data processing installation 6 wirelessly, or appropriate anchor nodes or mobile transmission and reception modules are used as an intermediate station between the manipulator 10 and the data processing installation 6. It is also possible for the animal tag 5 of the animal 2 that is to be vaccinated to receive the data from the manipulator 10 and to transmit them to the data processing installation 6.

In addition, the manipulation apparatus 7, i.e. the transmission apparatus 4 associated therewith, stores an appropriate identification signature or coding (the expression signature is used synonymously with the expression code in the description) that is likewise transmitted to the data processing installation 6 if it is significant to reconstruction of the manipulation on the animal 2 which manipulation apparatus 7 was used to perform the manipulation. By way of example, this may be advantageous for searching for errors if an error caused by the manipulation apparatus occurs during the manipulation.

The substance to be administered, that is to say in this example the vaccine, is preferably likewise provided with an identification signature, for example a barcode on the packaging, that can be transmitted to the receiver before, at the beginning of or during the manipulation. By way of example, the identification signature can be read by means of a reading apparatus of the manipulation apparatus 7 and transmitted to the data processing installation, preferably wirelessly, in the manner described. On the other hand, there is also the possibility of the substance itself, particularly the packaging thereof, having a transmission device that transmits the identification signature to the data processing installation 7. This can take place when the substance is inserted or poured into the manipulation apparatus 7, for example, to which end the transmission apparatus for the substance may have an appropriate sensor. On the other hand, the transmission can also be initiated by virtue of the transmission apparatus for the substance receiving data for the animal 2 from the animal tag 5 as soon as the manipulation apparatus 7 touches the animal 2 and hence the animal 2 being used to transmit data the data thereof to the transmission apparatus for the substance, said data initiating the transmission of the substance data.

The animal tag 5 likewise stores an identification signature for the animal 2 that allows explicit association of the data generated during the manipulation with said animal 2. For transmission of the data, the animal tag 5 may have an appropriate transmission apparatus. Similarly, when the manipulation apparatus 7 is in contact with the animal 2, said data can be read by the manipulation apparatus 7 and the "data line" produced thereby and transmitted by the transmission apparatus 4 thereof to the data processing installation 6. Alternatively, this can also be effected using the optionally existent transmission apparatus for the substance.

The actual manipulation of the animal 2 consists of the administration of the vaccine. The data generated in the process, i.e. the positive confirmation that the vaccine has already actually been administered, are compulsively transmitted to the data processing installation 6 after the vaccine has been administered. By way of example, this can be recognized by virtue of the vaccination gun having a sensor that recognizes that a trigger 12 on the vaccination gun has actually been pulled. Since the vaccine is subsequently injected in a fraction of a second, the probability of the vaccination gun having been pulled out of the animal 2 during this short interval of time and hence the vaccine having been delivered into thin air is relatively low. The method according to the invention thus achieves a high degree of certainty that the data entry in a vaccination log that the vaccine has actually been administered is correct.

To avoid even this short period of possibility of an error, however, provision may be made for the data from the administration of the substance to be transmitted only if the data line via the animal 2 to the animal tag 5 has not been interrupted during the administration, that is to say that the network between the manipulation apparatus 7 and the animal tag 5 has existed for the entire period of administration of the substance.

Detection of the substance having left the manipulation apparatus 7 can also take place in another way, for example by means of a flow sensor, etc.

In the simplest variant embodiment, those data that are directly related to the manipulation are transmitted only after the manipulation has taken place. Using the example of the vaccination, that is to say only after the complete provided quantity of substance has been administered.

In principle, however, it is also possible that although the data are transmitted, the absence of confirmation of the positive conclusion, for example of the trigger 12 of the vaccination gun being pulled, means that the data processing installation 6 does not enter them into the relevant log.

Instead, the data can be or stored in a separate log (for erroneous or incomplete manipulations).

Preferably, still further data relating to the manipulation are transmitted, particularly data relating to the identification of the administered substance, relating to the quantity of the administered substance, relating to the identification of the manipulation apparatus 7 and relating to the location and relating to the instant (time and date) of the administration, which means that the log produced in the data processing installation 6 can provide complete documentation of the manipulation (who, what, how much, when, where).

In the variant embodiment of the invention as insemination of the animal 2, the positive conclusion of the manipulation can be detected on the basis of the empty container 9, to which end said container 9 may have an appropriate sensor and possibly an appropriate transmission apparatus if the data are not transmitted by means of the animal tag 5 itself. Since the hose line of the insemination belt 8 is introduced a relatively long way into the animal 2, the probability of said hose line being unintentionally pulled out is negligibly low. In this connection, it should be pointed out that insemination is a process that extends over a relatively long period of time, during which the animals 2 are usually able to move freely. It is therefore advantageous if, as explained above, the system 1 is embedded in a locating system or comprises the latter.

In the event of temperature measurement in the animal 2, the end point of the temperature measurement can be detected when the temperature in the thermometer does not increase further, as is known in the case of electronic thermometers, in which the end point of the temperature measurement is indicated by means of an audible signal, for example. In the application for animals 2, an electrical signal that initiates the data transmission or confirms the positive conclusion of the temperature measurement is preferably produced. That the thermometer is actually in the animal 2 during the measurement in this case can be determined by the data interchange on the basis of the data line via the body of the animal 2 (usually the temperature is measured in the anus of the animal 2).

Generally, in the event of nonpositive conclusion of the manipulation, an error code can be produced, for example in the animal tag or in the transmission apparatus 4 of the manipulation apparatus 7, that is transmitted to the data processing installation 6 and can be entered into the relevant log.

In any case, with the exception of the data interchange directly on the animal 2 via the body of the animal 2, particularly the skin of the animal, the data in the network are preferably transmitted wirelessly.

A further preferred exception for the wireless data transmission relates to the data transmission by the transmission apparatus 11, which contributes the identification code of the manipulator for documenting a manipulation. Since the transmission apparatus is in the form of an armband, for example, and is worn by the manipulator in direct body contact, it is possible for data to be transmitted from the transmission apparatus to the manipulation appliance via the body, particularly the skin, of the manipulator. In comparison with the use of wireless data transmission, this decreases the risk of identification code from the manipulators being incorrectly associated in the system when there are a plurality of manipulators working in physical proximity to one another.

For data transmission via the skin, reference may be made to the relevant literature. In this regard, it should merely be noted that capacitive coupling via the body of an animal 2 or of the manipulator 10 connects the manipulation apparatus 6, touching said body, with the transmission apparatus 11 and the animal tag 5 to one another to form a network.

According to one variant embodiment, provision may be made for touching the animal 2 with the manipulation apparatus 6 to transmit data associated with the animal 2 to the manipulation apparatus 6 and to display said data thereon. Should the display function be a disturbance, for example because said data are displayed whenever an animal 2 is touched unintentionally, this function can also be switched off or deactivated on the manipulation apparatus when needed.

The method according to the invention has the advantage that data relating to the implementer, that is to say to the manipulator 10, are automatically stored for each manipulation, that is to say particularly each medication, on the animal 2, as well as preferably data relating to the location of the manipulation and/or the instant of the manipulation too. In the event of positive conclusion of the manipulation, that is to say particularly when the substance has been administered or the temperature has been measured, the data, at least the data directly related to said manipulation, are sent from a network node (for example the vaccination gun, i.e. the manipulation apparatus 7 or the transmission apparatus 4 associated therewith) to the network for data transmission and hence to a central database of the data processing installation 6, preferably via a radio network. It is therefore also possible to calculate the waiting times for the sale and consumption of the substance and to display them to the manipulator 10. Hence, it is also possible for the relevant data to be forwarded automatically or semiautomatically to a central office (federation/state/organization). Preferably, when the animal 2 is touched by the manipulator 10, the inductive coupling means that the animal data from said animal 2 are selected from a list of animals on a mobile appliance, e.g. a tablet PC or a smartphone, and displayed. The substance can be associated with the animal by means of the manipulation apparatus 10, that is to say the administration appliance, for example by means of RFID, barcode recognition, NFC.

It is thus possible to automate recordings relating to medicaments/medications, vaccinations, inseminations and temperature measurements in animals. The manipulator 10, the animal 2 and the substance and possibly the manipulation apparatus preferably each have a transmission and/or reception unit for inductive coupling to the animal 2 and for wireless communication with the network.

The following can be stored as data: personal data for the manipulator 10, animal ID, type of medicament, amount of medicament, type of administration, date, time, location/position on the basis of position recognition (x, y, z coordinates). Further data can likewise be transmitted as required.

The system can also be used to automatically balance the inventory (for example of medicaments) via the data processing installation 6.

Storage can be prevented until there is a positive conclusion to the manipulation. To this end, an appropriate software program may be stored in the data processing installation 6. Alternatively, it is possible for said program to be stored in a memory of the transmission apparatus 4 and/or a memory of the reception apparatus 3 and to prevent the transmission of the data until the positive conclusion is reported.

The animal-specific data from the animal 2, which are stored in the data processing installation 6 and/or the electronic animal tag 5, for example, e.g. the type of animal 2, the age of the animal 2, the weight of the animal 2, etc., can also be used to calculate the quantity of substance to be administered in the data processing installation 6 or in the manipulation apparatus 7, so that the particular correct quantity of substance is automatically delivered by the manipulation apparatus 7.

Particularly in the case of large animal herds (e.g. pigs, sheep, cows, etc.), the invention has the advantage that, in the case of mass vaccination, for example, the individual animals 2 can be automatically marked as "completed" with a relatively great degree of certainty, which can save time and facilitate the work. Simply touching the animal 2 allows the provision of a transmission path that can be used to explicitly identify the animal 2, particularly in interaction with the electronic animal tag 5. It is thus possible to effect capacitive coupling of a signal from the wireless network onto the animal 2. In other words, it is possible to implement "human/animal coupling" for the purpose of data interchange.

For wireless data transmission, reference may be made to the relevant prior art in this regard, particularly to the modulation of the carrier signal for the purpose of data transmission.

Figure 2:
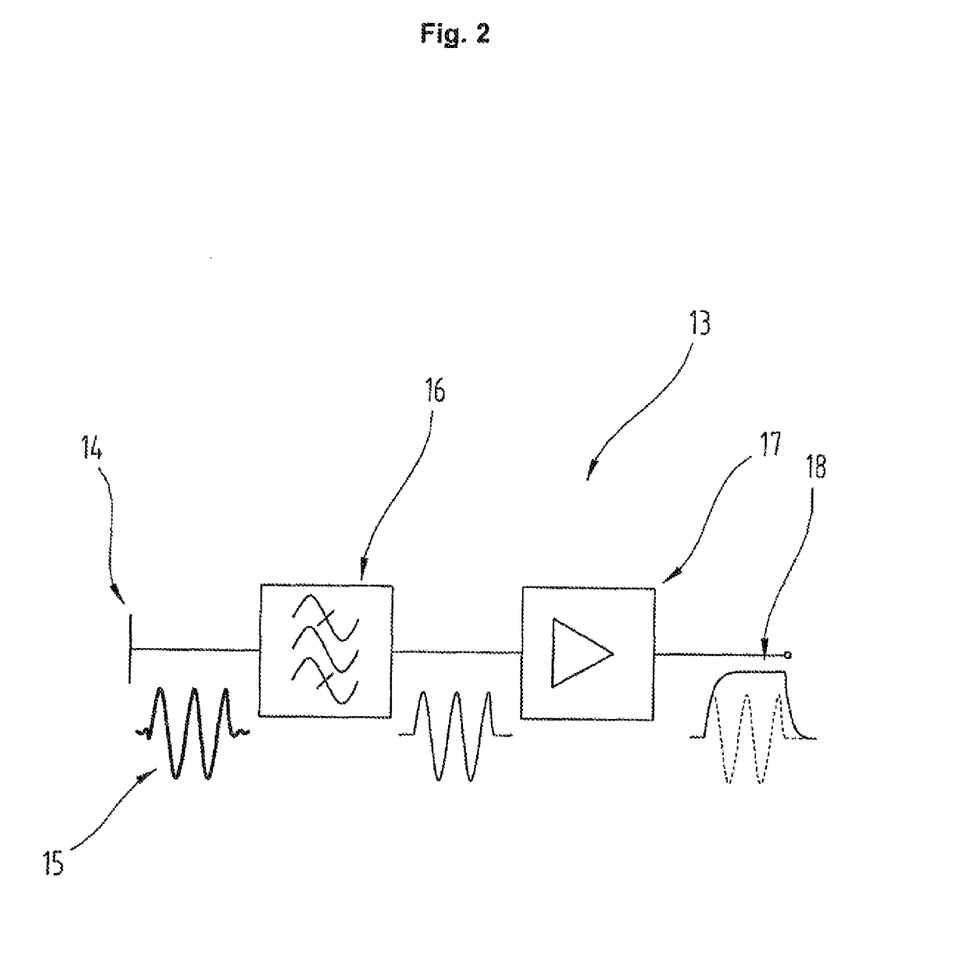
FIG. 2: shows a first variant embodiment of a receiver circuit.

FIG. 2 shows a first variant embodiment of a possible circuit 13 of the reception apparatus 3 (FIG. 1) in the form of a block diagram.

At this juncture, it should be mentioned that there are a wide variety of options for the form of the circuits of the reception apparatus 3 and the transmission apparatus 4, and it is not possible to cite all of them at this juncture. The illustrations in FIGS. 2 to 4 are therefore only explanatory rather than restrictive in nature.

The circuit 13 comprises or consists of an electrode 14 that supplies a signal 15 and is fitted to the animal 2 (FIG. 1). Said signal 15 is processed in an active bandpass filter 16 (OPV circuit with high input impedance=passive high-pass filter). The active bandpass filter 16 is electrically conductively connected to the electrode 14. Arranged downstream of the bandpass filter 16 is a logarithmic amplifier 17 that finally delivers an output signal 18 that, as shown in FIG. 3, differs significantly from the sensed signal 15.

Should the base level of the output signal 18 be too high in this case, there is the option of providing a narrowband filter having a center frequency at the level of the carrier frequency.

Figure 3:
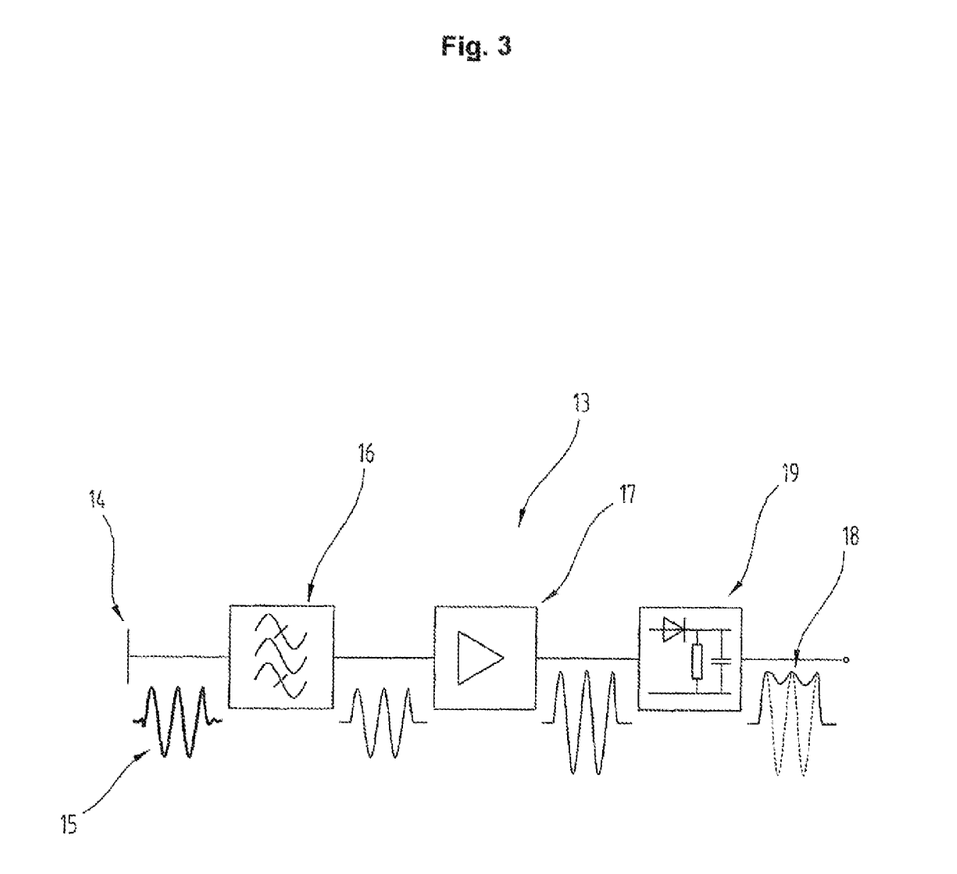
FIG. 3: shows a second variant embodiment of a receiver circuit.
Figure 4:
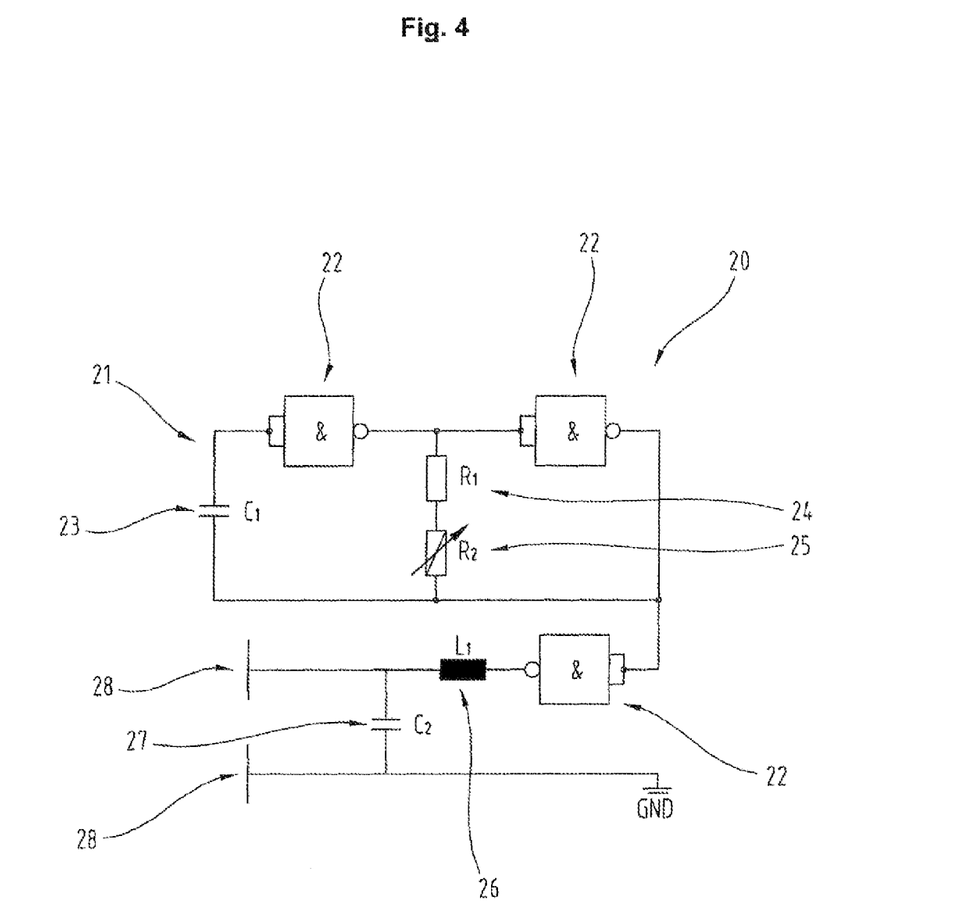
FIG. 4: shows a variant embodiment of a transmitter circuit.

FIG. 3 shows a block diagram of a further variant embodiment of the reception apparatus 3. Said reception apparatus again comprises the electrode 14 and the active bandpass filter 16 electrically connected thereto. Arranged downstream of the bandpass filter 16 is a nonlogarithmic amplifier 17. The amplifier 17 has an envelope detector 19 connected to it, which in turn delivers the output signal 18 to be processed further.

On the input side, this circuit 13 may likewise contain a filter that can be used to filter out disturbances above and below the carrier frequency.

In this variant embodiment, the amplifier 17 may be constructed from, in particular three, operational amplifiers.

Using the envelope detector 19, it is firstly possible to cut away the negative half-cycle of the amplified AC signal, and secondly the positive half-cycle can be used to charge a capacitor. It is therefore possible to tap off the envelope of the signal from the capacitor, the ripple in said envelope being all the lower the greater the time constant □ of the RC combination.

The negative half-cycle can be chopped by using a diode. In particular, a diode having a low forward voltage is used, in order to be able to use as large a component of the output signal as possible to charge the capacitor.

In two variant embodiments of the circuit 13, the output signal 18 can be delivered to a microcontroller. In order to obtain a better squarewave signal in the variant embodiment of the circuit 13 shown in FIG. 3, the envelope detector 19 can have a comparator connected downstream of it.

FIG. 4 shows a variant embodiment of a circuit 20 of the transmission apparatus 4 (FIG. 1). Said circuit comprises a clock generator 21. The clock generator 21 comprises or consists of two NAND gates 22, preferably in CMOS technology. Together with a capacitor 23, a resistor 24 and a potentiometer 25, the NAND gates 22 form an oscillating circuit portion.

Preferably, a third NAND gate 22 is connected to the output side of the clock generator 21. Said third NAND gate 22 can be used to effect further signal conditioning by using it to remove the charging and discharge curve of the capacitor that is superimposed on the squarewave signal.

Connected to the output side of the second or third NAND gate 22, said circuit 20 also comprises a coil 26 and a capacitor 27 connected thereto. In addition, said circuit also comprises transmission electrodes 28.

The data transmission can be effected using an OOK method, i.e. the modulation can be implemented simply by switching a supply voltage (for example from a 5 V DC voltage source) on/off.

When the signal to be transmitted is provided by a microcontroller, the latter can be used directly to supply power to the circuit, provided that it can drive sufficient current at the output. Alternatively, it is possible for the circuit power supply to be modulated using a normally off field-effect transistor, which can be controlled almost with no power by a microcontroller. If power is supplied directly using the microcontroller, it is possible to provide a suppression filter, which consists of a parallel filter and a ferrite coil in series, for example, as shown in FIG. 4.

The exemplary embodiments show possible variant embodiments of the system 1, and it should be noted at this juncture that various combinations of the individual variant embodiments with one another are also possible and this possibility of variation is within the ability of a person skilled in the art working in this technical field on the basis of the teaching relating to the technical action by a substantive invention.

For the sake of order, it should finally be pointed out that, as an aid to understanding the design of the system 1, said system and the parts thereof have in some cases been shown not to scale and/or in enlarged and/or reduced form.

In addition, it should be noted that the manipulator 10 does not necessarily have to be a human being as shown and described hitherto. It may also be an apparatus, typically a type of robot, for example a milking robot that is equipped with an ancillary apparatus that can be used for vaccination, for example, or to perform temperature measurement or to apply a cream, etc.

In addition, it should be clarified that the transmission apparatus 11 that stores an identification code for the manipulator, said identification code being transmitted in the event of a manipulation, may also be connected directly to the manipulation apparatus 7. By way of example, the transmission apparatus 11 may be an electronic memory element that needs to be coupled to the manipulation apparatus 7. The advantage that this means that the manipulator de facto needs to carry only one appliance instead of two is opposed by the disadvantage that this increases the risk of it being misunderstood that the transmission apparatus 11 needs to be associated with precisely one manipulator and, as intended, must not be relayed with the manipulation apparatus 7 from one manipulator to another manipulator.

The invention claimed is:

1. A method for recording data that are generated when a manipulation event is performed on an animal by a human manipulator, wherein the method comprises:
   upon performing a manipulation event on an animal, transmitting data from a manipulation transmission apparatus to a reception apparatus, wherein a network comprising the manipulation transmission apparatus, the reception apparatus and the animal is set up for the transmission of the data, and wherein the animal is recognized on the basis of an identification tag associated with the animal providing an animal identification code, and
   automatically capturing the identity of the manipulator and the animal identification code for inclusion as part of the manipulation event data,
   wherein the manipulator's identity is provided by a manipulator identity apparatus that the manipulator wears in direct body contact that stores a manipulator identification code, the manipulator identification code becoming part of the manipulation event data, the manipulator identity apparatus transmitting the identification code associated with the manipulator, using the body of the manipulator as a transmission path for sending manipulator's identification code to the manipulation transmission apparatus via a capacitive coupling.

2. The method as claimed in claim 1, wherein the manipulation event is the administration of a substance to an animal and in that the stored data comprise a type and quantity of the administered substance and the location and time of the manipulation event.

3. The method as claimed in claim 1, wherein the data are sent only on condition that the network has not been interrupted during the manipulation.

4. The method as claimed in claim 1, wherein the manipulation identity apparatus has an identification signature that is transmitted to the reception apparatus.

5. The method as claimed in claim 4, wherein touching the animal with the manipulation identity apparatus transmits data associated with the animal to the manipulation apparatus.

6. The method as claimed in claim 1, wherein an electronic animal tag fitted to the animal is incorporated into the network.

7. A system for recording data that are generated by the manipulation of an animal as performed by a human manipulator, wherein the system comprises:
   at least one manipulation transmission apparatus and at least one reception apparatus that are designed for communication via the skin of the animal, and wherein the manipulation transmission apparatus and/or the reception apparatus comprises a data memory that stores a software program, and
   a manipulator identity apparatus that is worn by the manipulator in direct body contact, wherein the manipulator identity apparatus stores an identification code for the manipulator and wherein the manipulation transmission apparatus can be controlled by a software program to transmit the identification code in the event of a manipulation event and wherein the manipulation transmission apparatus communicates with the manipulator identity apparatus via the skin of the manipulator.

8. The system as claimed in claim 7, wherein the network also comprises a manipulation apparatus that is formed by a vaccination gun or a medical thermometer or an insemination device.

9. The system as claimed in claim 7, wherein the manipulation transmission apparatus can read an electronic animal tag.

10. The system as claimed in claim 9, wherein the electronic animal tag forms a network node in a locating system.

* * * * *